L. C. COLLER.
GRIP FOR FISHING RODS.
APPLICATION FILED APR. 8, 1907.
965,989.
Patented Aug. 2, 1910.
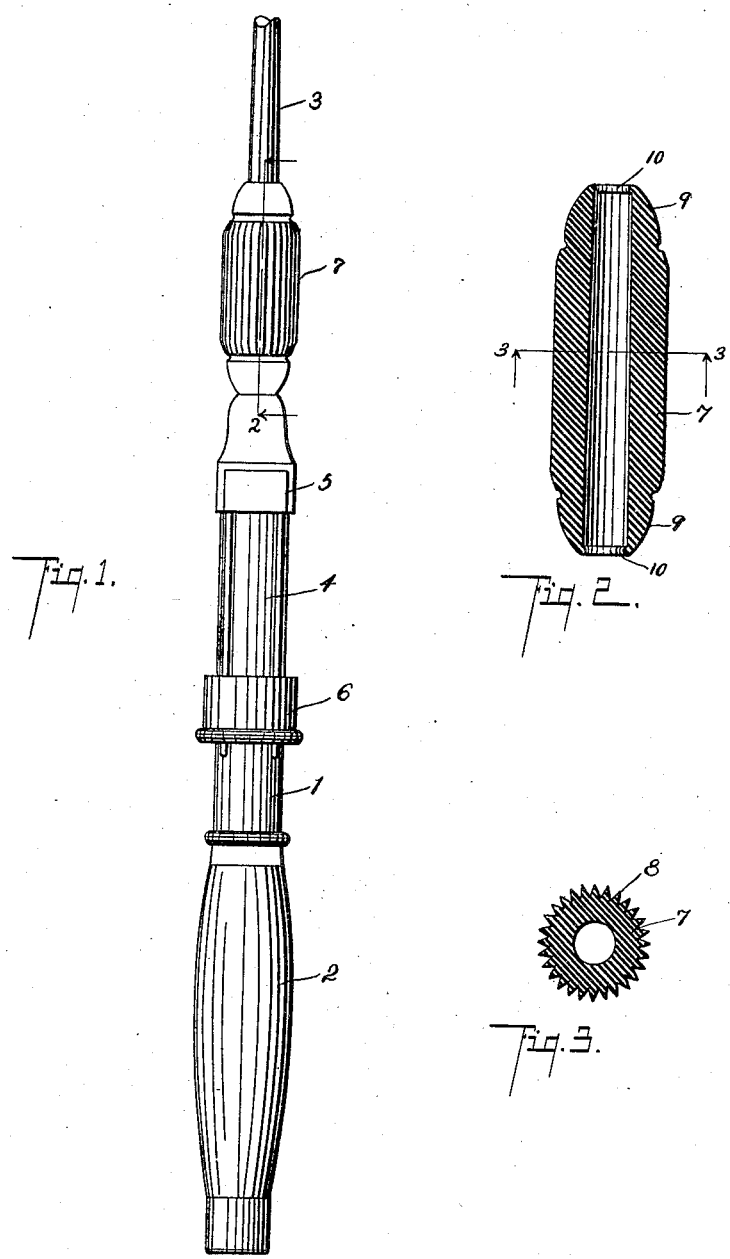

UNITED STATES PATENT OFFICE.

LEONARD C. COLLER, OF COLDWATER, MICHIGAN.

GRIP FOR FISHING-RODS.

965,989.  Specification of Letters Patent.  Patented Aug. 2, 1910.

Application filed April 8, 1907. Serial No. 367,062.

*To all whom it may concern:*

Be it known that I, LEONARD C. COLLER, a citizen of the United States, residing at the city of Coldwater, county of Branch, State of Michigan, have invented certain new and useful Improvements in Grips for Fishing-Rods, of which the following is a specification.

This invention relates to improvements in grips for fishing rods.

My improvement relates particularly to grips commonly designated as reeling grips, although adapted for use in other relations.

The main objects of my invention are: First, to provide an improved grip for fishing rods which may be readily attached and which is adapted for use on various sizes and styles of rods. Second, to provide an improved grip for fishing rods which is comfortable to the grasp and has an agreeable feeling under all conditions of weather. Third, to provide an improved grip for fishing rods which is very secure and one which is water proof.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which, Figure 1 is an elevation view of the butt end of a fishing rod having my improved grip in position thereon. Fig. 2 is a detail longitudinal section of my improved grip removed from the rod, taken on a line corresponding to line 2—2 of Fig. 1. Fig. 3 is a detail cross section thereof, taken on a line corresponding to line 3—3 of Fig. 2.

In the drawing, similar numerals of reference refer to similar parts throughout the several views.

Referring to the drawing, 1 represents the butt section of a fishing rod which may be of the usual or any desired construction. The section 1 is provided with a fixed grip 2. The butt section is adapted to receive the rod 3, but as the details of the connection form no part of this invention, they are not here illustrated. The butt section is also provided with a suitable reel seat 4 and with reel clamping members 5 and 6 respectively.

The detachable reeling grip 7 is formed of soft or flexible rubber and is adapted to be slipped upon the rod 3. The grip is provided with a plurality of longitudinal A-shaped ribs which are comparatively thin so that they readily yield to the grasp, thereby preventing the hand from slipping on the grip and also preventing the sticking of the hands in hot weather, rendering it not only secure but agreeable and comfortable to the user. The bore of the grip is tapered so that it may be readily and easily slipped upon the rods.

Each end of the grip is provided with outwardly tapered or conical end portions 9 terminating in inwardly projecting flange-like lips 10. These tapered portions secure a very firm grasp of the grip upon the rod, the lips insuring a tight joint between the rod and the grip, thereby excluding moisture and also making its hold upon the rod more secure. These tapered ends with the lips have the further advantage of making a single size of grips adapted to fit rods of considerably varying sizes.

My improved grip is adapted for use on steel or wood rods, as it effectively remains in its adjusted position on either material. It is also very economical to produce and is quickly applied to or removed from the rod, and is very desirable in use, as stated.

Having thus described my invention, what I claim as new and desire to secure by Letters Patent, is:

1. The combination with a fishing rod, having a reel seat thereon; of a reeling grip adapted to be arranged on said rod above said seat, said grip being formed of soft rubber and having a longitudinal tapered hole therethrough, with inwardly projecting lips at each end thereof, said grip being provided with tapered end portions and with longitudinal corrugations between said end portions.

2. The combination with a fishing rod, having a reel seat thereon; of a reeling grip adapted to be arranged on said rod above said seat, said grip being formed of soft rubber and having a longitudinal tapered hole therethrough, with inwardly projecting lips at each end thereof, said grip being provided with longitudinal corrugations.

In witness whereof, I have hereunto set my hand and seal in the presence of two witnesses.

LEONARD C. COLLER. [L. S.]

Witnesses:
CHAS. F. CARPENTER,
HENRY E. STRAIGHT.